US012787973B2

(12) United States Patent
Grigoryev

(10) Patent No.: US 12,787,973 B2
(45) Date of Patent: Nov. 10, 2026

(54) HYGIENIC PET DRINKING WATER FOUNTAIN

(71) Applicant: Andrey Grigoryev, Fort Lee, NJ (US)

(72) Inventor: Andrey Grigoryev, Fort Lee, NJ (US)

( * ) Notice: Subject to any disclaimer, the term of this patent is extended or adjusted under 35 U.S.C. 154(b) by 0 days.

(21) Appl. No.: 19/273,591

(22) Filed: Jul. 18, 2025

(65) Prior Publication Data

US 2026/0033455 A1 Feb. 5, 2026

Related U.S. Application Data

(60) Provisional application No. 63/678,613, filed on Aug. 2, 2024.

(51) Int. Cl.
*A01K 7/02* (2006.01)

(52) U.S. Cl.
CPC .................................... *A01K 7/025* (2013.01)

(58) Field of Classification Search
CPC .................................. A01K 7/025; A01K 7/02
See application file for complete search history.

(56) References Cited

U.S. PATENT DOCUMENTS

| | | | | |
|---|---|---|---|---|
| 6,257,560 | B1 * | 7/2001 | Kim | B05B 1/265 261/36.1 |
| 7,270,082 | B2 | 9/2007 | Plante | |
| 9,572,323 | B2 * | 2/2017 | Lipscomb | A01K 7/02 |
| 2010/0095897 | A1 | 4/2010 | Rowe | |
| 2011/0067638 | A1 * | 3/2011 | Lipscomb | A01K 7/02 137/560 |
| 2011/0259273 | A1 * | 10/2011 | Lipscomb | A01K 45/002 119/74 |
| 2012/0137979 | A1 * | 6/2012 | Lipscomb | A01K 7/02 119/74 |
| 2012/0216751 | A1 | 8/2012 | Rowe | |
| 2013/0087102 | A1 * | 4/2013 | Lipscomb | A01K 7/00 119/74 |
| 2014/0069341 | A1 * | 3/2014 | Lipscomb | A01K 7/02 119/74 |
| 2016/0000037 | A1 | 1/2016 | Lipscomb et al. | |
| 2018/0271055 | A1 * | 9/2018 | Bianco | A01K 7/00 |
| 2019/0208745 | A1 * | 7/2019 | Milsom | A01K 7/022 |
| 2019/0239475 | A1 * | 8/2019 | He | E03C 1/04 |
| 2021/0345582 | A1 * | 11/2021 | Yoo | G01C 9/02 |
| 2024/0389551 | A1 * | 11/2024 | Guo | A01K 7/025 |

FOREIGN PATENT DOCUMENTS

| | | | |
|---|---|---|---|
| EP | 3315022 | A1 | 5/2018 |
| EP | 3626057 | A1 | 3/2020 |

* cited by examiner

*Primary Examiner* — Jessica B Wong
(74) *Attorney, Agent, or Firm* — Hudak, Shunk & Farine Co. LPA

(57) ABSTRACT

The present invention relates to a pet drinking water fountain, and more particularly to a pet drinking water fountain having a submersible pump assembly that continuously circulates water, wherein the fountain includes a basin, cover and fountainhead having a tube to elevate the water formed from a material, preferably glass, that is hygienic, easy to clean, and allows visibility of the water level and clarity thereof.

20 Claims, 4 Drawing Sheets

HYGIENIC PET DRINKING WATER FOUNTAIN

CROSS-REFERENCE

This application claims priority to U.S. Provisional Application Ser. No. 63/678,613 filed Aug. 2, 2024, herein fully incorporated by reference.

FIELD OF THE INVENTION

The present invention relates to a pet drinking water fountain, and more particularly to a pet drinking water fountain having a submersible pump assembly that continuously circulates water, wherein the fountain includes a basin, cover and fountainhead having a tube to elevate the water formed from a material, preferably glass, that is hygienic, easy to clean, and allows facile visibility of the water level and clarity thereof.

BACKGROUND OF THE INVENTION

Many different animals, in particular house pets such as cats and dogs, have a preference for drinking flowing water. Flowing water can offer a number of advantages, including the ability to keep water fresh, improved taste, and improved quality as compared to stagnant water. Flowing water typically has more dissolved oxygen than standing water. In addition, flowing water may encourage animals to drink more fluids. Increased fluid intake may help reduce or prevent problems with an animal's urinary tract and improve overall health.

Pet water fountains commercially available in the marketplace are primarily made from one or more of plastic, stainless steel and ceramics. Each of these materials has its advantages and disadvantages. Stainless steel and ceramic are opaque, often making it difficult to see the water level and clarity of the water. Plastic, which can sometimes be transparent, can be difficult to clean and may not be conducive to maintain hygiene. Additionally, these materials can leach unwanted and harmful chemicals into the drinking water.

Still further, many animals are drawn to running water and can find it entertaining or interesting.

The prior art includes a wide variety of different types and structures which have been developed to provide running water for animals. For example, systems and methods for providing water to animals include the following art:

US 2010/0095897 relates to systems and methods for watering animals that generally include a container having an inner recess. A pump directs water from the inner recess of the container through a fluid column, which may contain filter medium. One or more spouts are located at a terminal end of the fluid column and direct the water in one or more streams back to the inner recess of the container. The spouts may be associated with one of various spout plates that can be interchanged with one another and adjusted to orient the streams of water. Some embodiments employ a restrictor plate that may be variably positioned within the flow of water. Other embodiments provide a variable speed pump that incrementally adjusts the rate of flow.

US2016/0000037 relates to a pet drinking fountain assembly having a pump forming part of a fountain mounting arrangement that includes a lift tube coupling a cover to the pump coupled to a lower basin by a mount. The mount and lift tube attenuate pump noise and vibration by providing isolation from the basin and cover and can function as dampeners. In a preferred embodiment the pump is part of a pump module that includes a module housing to which the pump is attached by another noise-attenuating mount. Each mount is formed by one or more suction cups with the cups and lift tube made of vibration dampening material, such as a resilient vibration dampening or isolating material that can be an elastomeric material. The module includes a lift tube coupling discharge that registers in fluid flow communication with a pump outlet and can include a ring or bushing therebetween providing additional noise attenuation.

EP 3 315 022 relates to a drinking water fountain for pets that has a drinking bowl and a separate functional insert which comprises a control device, a pump, a pump circuit line and a second inductive transmission element of an electrical power supply. The water inlet of the pump circuit line reaches into the lower part of the drinking bowl. The water outlet of the pump circuit line is arranged to allow water sucked in from the drinking bowl to flow back into it. At least one water filter is arranged in the pump circuit line. The first of the two inductive transmission elements is assigned to the drinking bowl, which is supplied with electrical energy. Complementary positioning elements are provided on the inside of the drinking bowl and the outside of the functional insert, so that when the functional insert is inserted into the drinking bowl, the two inductive transmission elements are positioned at an effective distance from one another.

EP 3 626 057 relates to a liquid dispenser, comprising: a container configured to store liquid and having an upper end defining an upper opening; a base to support the container; a pump having an inlet to suction liquid stored in the container and an outlet to discharge the liquid; and a lid configured to cover the upper opening and having a hole through which liquid discharged from the pump flows; wherein the container further includes an outer wall and an inner wall, the inner wall extends upward at a first angle, and the outer wall extends upward at a second angle different from the first angle such that the outer and inner walls intersect at the upper end of the container and a space is formed between the inner and outer walls.

Even in view of the above-described devices, the art still needs pet water fountains that contain relatively few parts, are relatively easy to maintain, easy to clean, hygienic and allow rapid assessment of water level and clarity.

SUMMARY OF THE INVENTION

The problems of the prior art and others are solved by the present invention which provides a pet water fountain, having a basin, fountainhead including a tube to elevate the water and cover each made of a material such as glass which is hygienic, easy to clean and allows visibility of the water level and, clarity of the water.

In addition, the pet water fountain according to the invention is relatively easy to assemble, contains a small number of parts, and is easy to take apart and clean.

For the avoidance of doubt, it is understood that while various embodiments or aspects of the invention are described individually, it should be clear that two or more embodiments or aspects can be, and often times are, present in a single device or practiced in a method according to the present invention.

In one embodiment a pet drinking water fountain assembly comprises: a basin formed of a transparent or semi-transparent material for holding water; a cover formed of a transparent or semi-transparent material, having a top with an aperture, and a base; a submersible pump arranged on the floor of the basin, the pump having an outlet; a conduit comprising: a tubular portion having a lower end and an upper end; a positioning feature disposed along the tubular portion at a location spaced from the lower end, the positioning feature having a diameter greater than the cover aperture, such that the positioning feature rests on the top surface of the cover and suspends the tubular portion through the aperture; and wherein during operation, the pump circulates water from the basin through the conduit and out the positioning feature, allowing the water to flow over the outer surface of the cover and return to the basin.

In another embodiment the basin, cover, and conduit are formed of glass and the positioning feature is a flange integrally formed with or attached to the tubular portion.

In another embodiment the tubular portion extends above the positioning feature and terminates in an outlet opening or spout.

In a further embodiment the basin, cover, and conduit are dishwasher safe and modularly assembled without fasteners and the transparency of the basin and cover enables visual monitoring of water clarity and level.

In another embodiment the cover has no surface depressions and is shaped to encourage uniform water flow.

In still another embodiment the pump outlet comprises a cylindrical projection and the tubular portion fits over the cylindrical projection by friction or press-fit.

In another embodiment the cover includes at least two support legs and at least one opening between the legs to allow water flow underneath.

In a further embodiment the positioning feature comprises a shoulder, ring, ridge, or radially extended portion that prevents the conduit from falling through the aperture.

In another embodiment a method of assembling a pet drinking water fountain comprises the steps of: placing a submersible pump in a transparent basin; inserting a conduit through an aperture in a transparent dome-shaped cover; resting a positioning feature on the conduit against the top of the cover so that the conduit is suspended; connecting the lower end of the conduit to the outlet of the pump; placing the cover over the basin; and circulating water through the conduit and over the cover surface.

In another embodiment the water flows in a closed loop and is visible at all external flow stages, including within the basin and as it exits the conduit.

In another embodiment all fluid-contact surfaces are free of pores or joints that could harbor contaminants.

In a further embodiment a pet drinking water fountain assembly comprises: a glass basin for holding water, the basin including a bottom and a side wall connected to and extending upwardly from the bottom; a glass cover having a base, a top and a side wall extending between the base and the top, wherein the base rests upon an upper surface of the basin bottom, wherein the top has an aperture, a pump assembly arranged on the upper surface of the bottom of the basin beneath the cover, the pump assembly including a pump having an outlet for water; a glass fountainhead including a tube having a flange positioned along the tube at a location spaced from a lower end of the tube, the flange having a diameter greater than that of the aperture in the cover, such that the flange rests on the cover and supports the tube in a suspended position, with the lower end of the tube positioned to engage the pump outlet, wherein the tube has an aperture; wherein during operation of the fountain assembly the pump assembly delivers water to the fountainhead that flows out of the tube aperture, and downwardly onto the cover and into the basin where the water can be recirculated through the pump assembly.

In another embodiment the basin, the fountainhead, and the cover are substantially transparent in order to allow visual assessment of one or more of water level, water cleanliness, and basin cleanliness.

In a further embodiment the pump outlet comprises a cylindrical projection, and the lower end of the tube is operatively connected around and to the cylindrical projection of the pump outlet.

In another embodiment the flange is located at an upper end of the tube, and the flange has a rim that extends outwardly from the upper outer end of the tube and has a diameter greater than a largest diameter of the tube.

In a further embodiment a lower surface of the flange contacts an upper surface of the top of the cover.

In yet a further embodiment the base of the cover includes at least two legs, which rests upon the upper surface of the basin bottom, and the space between the at least two legs allow water to flow between the outside of the cover and inside of the cover.

In another embodiment three legs are present.

In a further embodiment the pump assembly is removably connected to the bottom of the basin by suction cups.

In a further embodiment the basin is a bowl having a cylindrical side wall.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
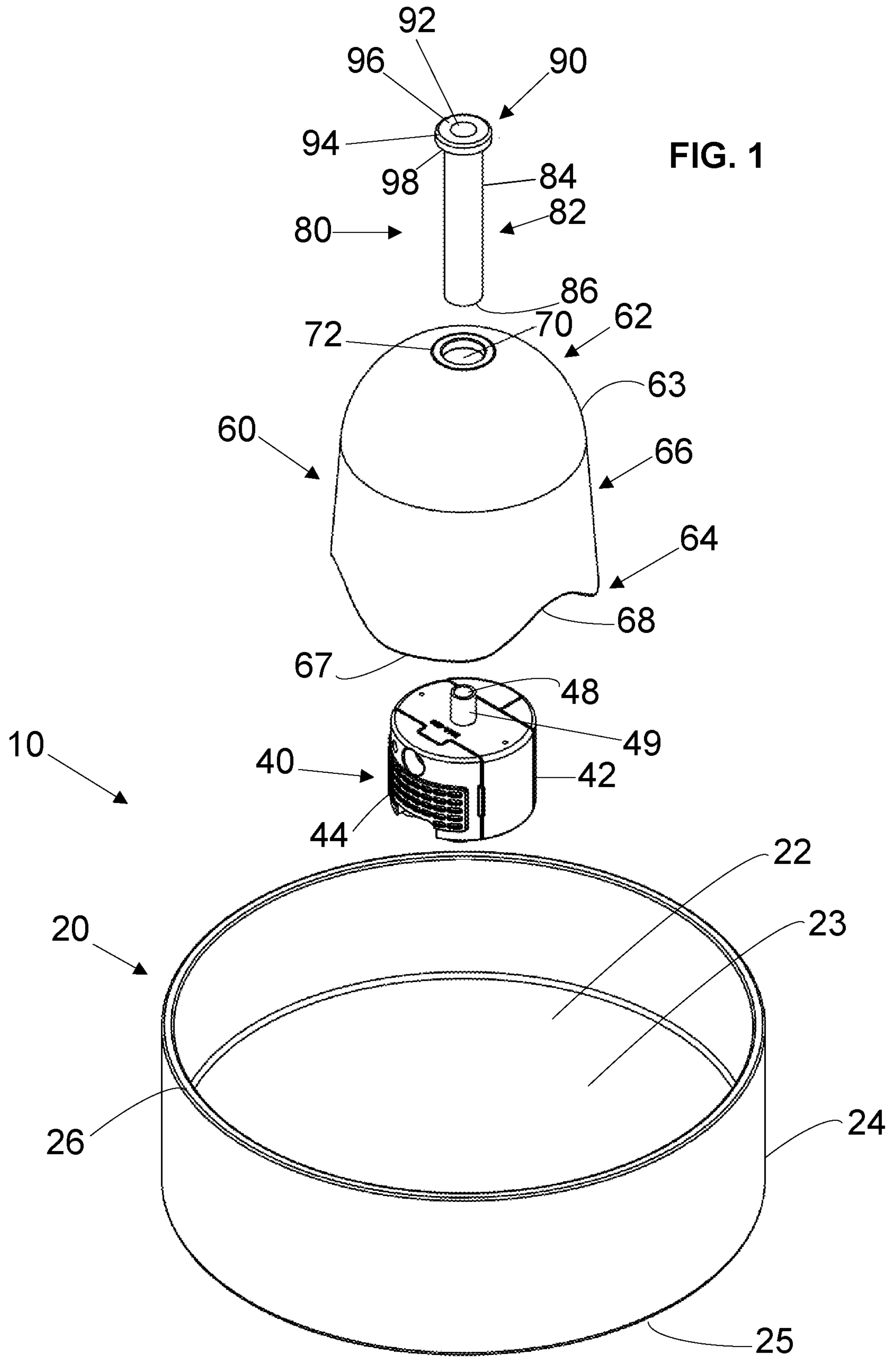
FIG. 1 is an exploded view of one embodiment of a pet water fountain according to the present invention showing the primary components thereof.

This description of preferred embodiments is to be read in connection with the accompanying drawings, which are part of the entire written description of this invention.

In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 2:
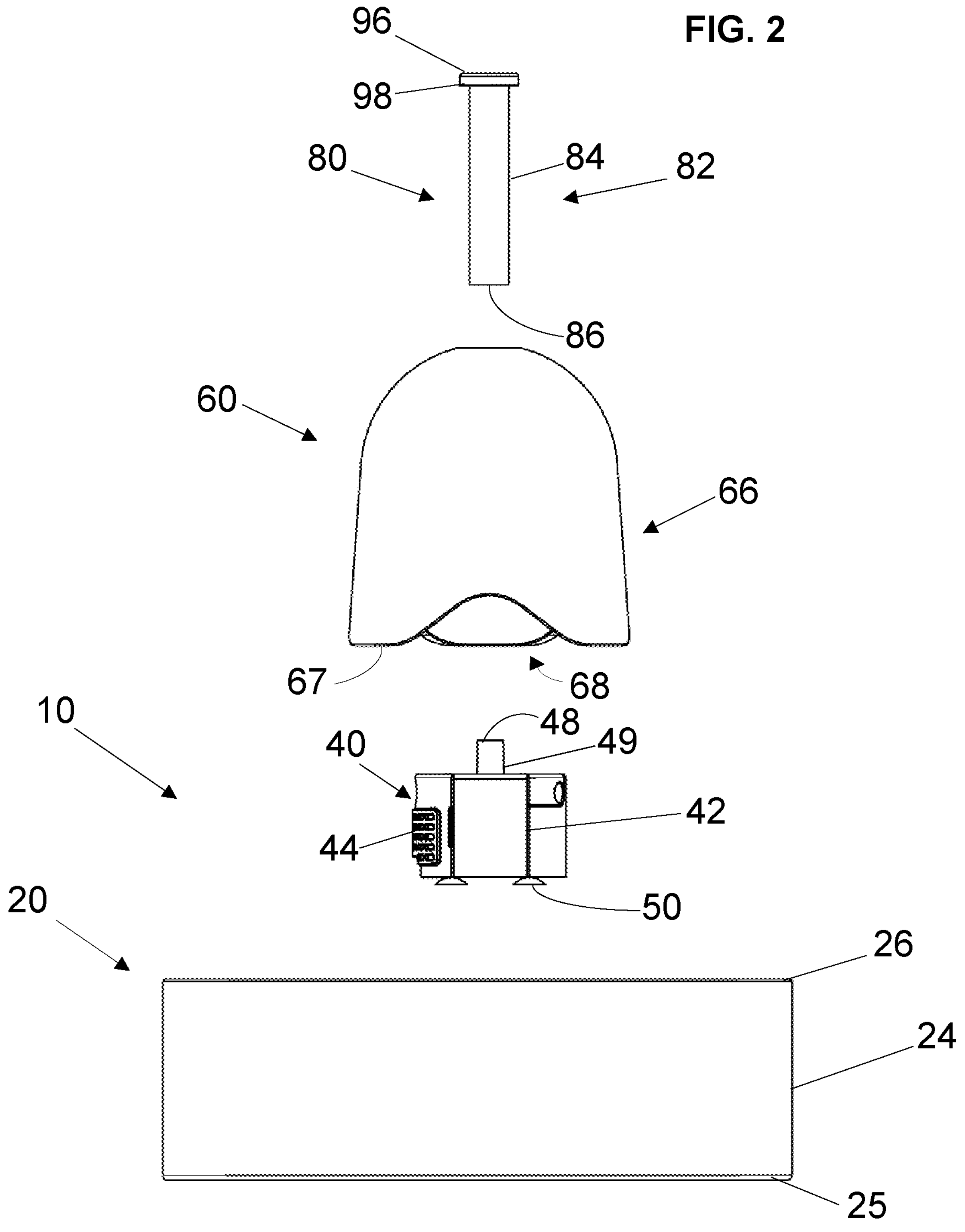
FIG. 2 is a side exploded view of the embodiment illustrated in FIG. 1.
Figure 3:
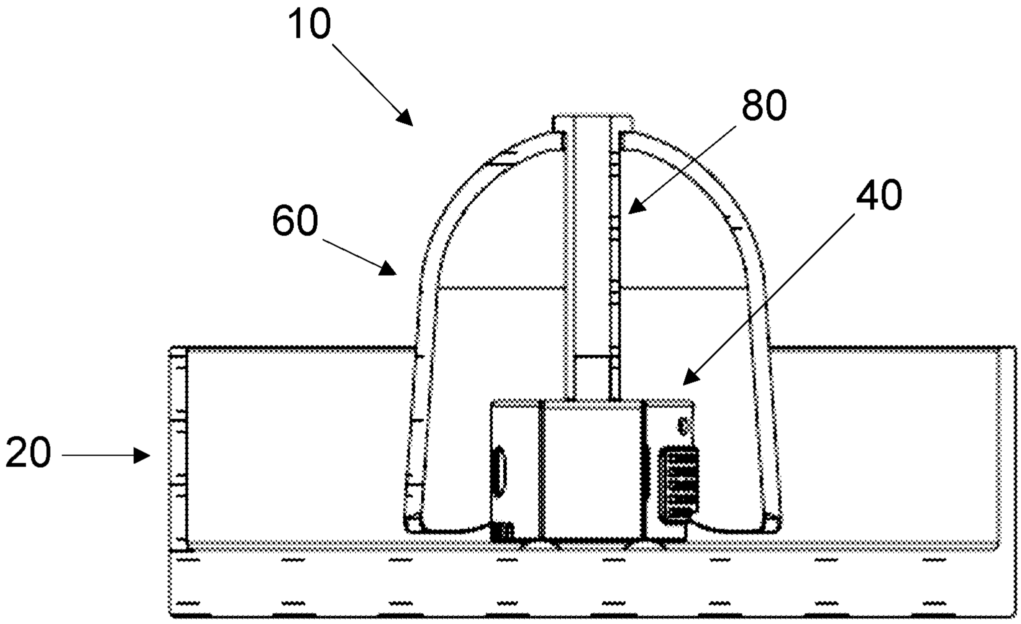
FIG. 3 is a cross-sectional view of one embodiment of the assembled pet water fountain.

Turning now to the drawings wherein like parts are referred to utilizing like reference numbers throughout the several views, FIGS. 1-3 illustrate a preferred embodiment of a pet water fountain assembly 10 according to the present invention. Water fountain assembly 10 includes a basin 20 to which pump assembly 40 is operatively connected to recirculate water within the water fountain during operation.

Water fountain assembly 10 includes a cover 60 over which water flows down around the outer surface thereof during operation. Pump assembly 40 during use is disposed under cover 60 and between cover 60 and basin 20 such that the pump assembly 40 may not appreciably visible when the water fountain is assembled.

Basin 20 includes a bottom 22 adapted to sit upon an ambient surface, such as the ground, a floor, a table, or the like, wherever it is utilized. Bottom 22 includes an upper surface 23 and a lower surface 25. Side wall 24 extends upwardly about the periphery of bottom 22 which allows the basin 20 to hold water during use. Side wall illustrated in the figures as a single wall disposed at about a 90° angle with respect to the plane formed by bottom 22 which provides stability and prevents the water fountain from easily tipping over when used by an animal. Stated in another manner, side wall 24 is preferably substantially vertically oriented. It should be readily understood by one of ordinary skill in the art that side walls of alternative construction can be utilized, such as, but not limited to side walls that curve inwardly and/or outwardly at various points along the height thereof. Rim 26 at the upper end of side wall 24 is preferably finished with a pet-friendly edge such as a rounded surface.

Bottom 22 of basin 20 has an upper surface 23 upon which and to which pump assembly 40 is placed or operatively connected, for example utilizing suction cups 50 as illustrated in FIG. 2.

Basin 20 formed of a durable, hygienic material. Preferably the material is glass, most preferably transparent or semi-transparent glass. By providing basin 20 formed of a material that is transparent or at least semi-transparent, easy visual assessments can be performed to determine whether or not basin 20 and/or water therein needs to be cleaned.

Pump assembly 40 includes a pump located inside pump housing 42 in order to circulate water from basin 20 through pump assembly 40, to fountainhead 80 through which the water flows out, over and down cover 60 back into basin 20. Pump assembly 40 preferably includes a replaceable filter not shown which aides in hygienic operation of the pet water fountain assembly 10. The filter is preferably located within pump housing 42 between inlet 44 which sucks water in from basin 20 and pump outlet 48 which expels water therefrom into fountainhead 80. The fountainhead may include or consist of a tube, flange and outlet portion.

Pump outlet 48 is preferably in the form of a cylinder which mates with lower end 86 of fountainhead 80. Lower end 86 of tube 82 is mateable with pump outlet 48. In one embodiment, the tube 82 fits loosely over pump outlet 48. In other embodiments, a tight interference-type connection is present between pump outlet 48 and lower end 86 of tube 82 of the fountainhead 80. Pump assembly 40 is operated by a suitable power source, not shown. Any suitable power source can be utilized, such as AC power or DC power such as a battery.

Fountainhead 80 is aligned with cover 60 by extending tube 82 of fountainhead 80 through aperture 70 in cover 60 whereby the lower end 86 of tube 82 is connected to pump outlet 48. Tube 82 has an upper end 84 with an aperture 92 which allows water to flow out of the fountainhead 80.

Flange 90 is formed or otherwise connected to upper end 84 of tube 82 of fountainhead 80 at a location at or below tube aperture 92. Flange 90 includes rim 94 having an outer diameter that is greater than the largest outer diameter of tube 82 such that fountainhead 80 cannot pass completely through aperture 70 in cover 60. Flange 90 preferably includes a rounded outer surface about rim 94 that allows water to flow smoothly over the outer surface 96 of the flange. The flange is thus a positioning feature including, but not limited to, ridge or collar on the tube that prevents the tube from passing through the cover aperture, thereby suspending it in alignment with the pump outlet. Flange 90 is positioned along tube 82 at a location spaced from its lower end 86, such that it prevents the tube from passing completely through aperture 70 in cover 60. This allows the tube to be suspended from cover 60, with lower end 86 aligned over pump outlet 48. In some embodiments, the tube may continue above the flange to connect with additional outlet components such as spouts or nozzles. In addition to suspending the conduit in position, the flange also functions to stabilize the conduit against lateral movement and acts as a hydrodynamic shield, preventing water from re-entering the aperture in the cover. This dual-purpose design promotes clean water flow over the dome and minimizes turbulence or leakage into the underlying structure.

Lower surface of flange 90 preferably contacts upper surface 72 of flange aperture 70 of cover 60 when the water fountain is assembled. In other embodiments, the length of tube 82 is such that lower surface 98 of flange 90 is spaced from upper surface 72 of aperture 70 of cover 60. Preferably, no intervening structure is present between pump outlet 48 and lower end 86 of tube 82.

Figure 4A:
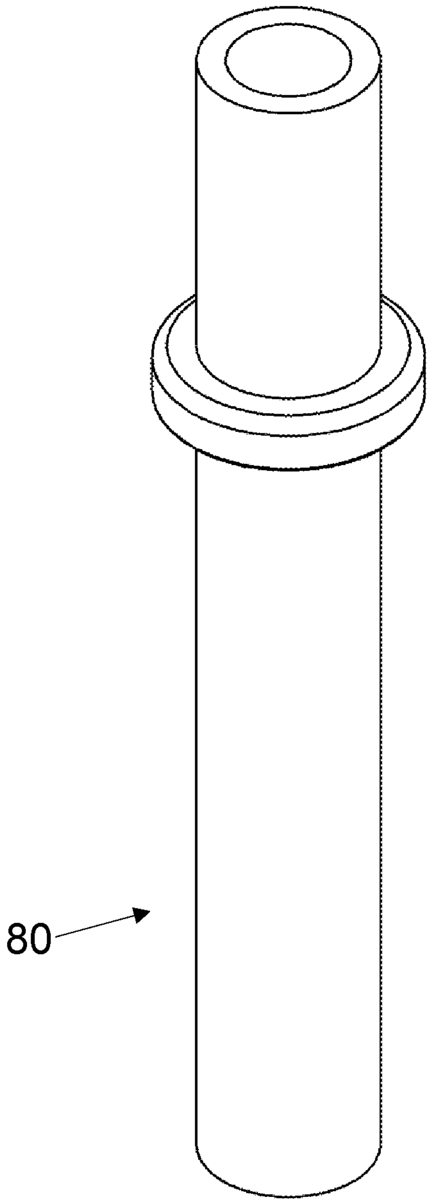
FIGS. 4*a* and 4*b* illustrate alternative embodiments of fountainheads of the present invention.
Figure 4B:
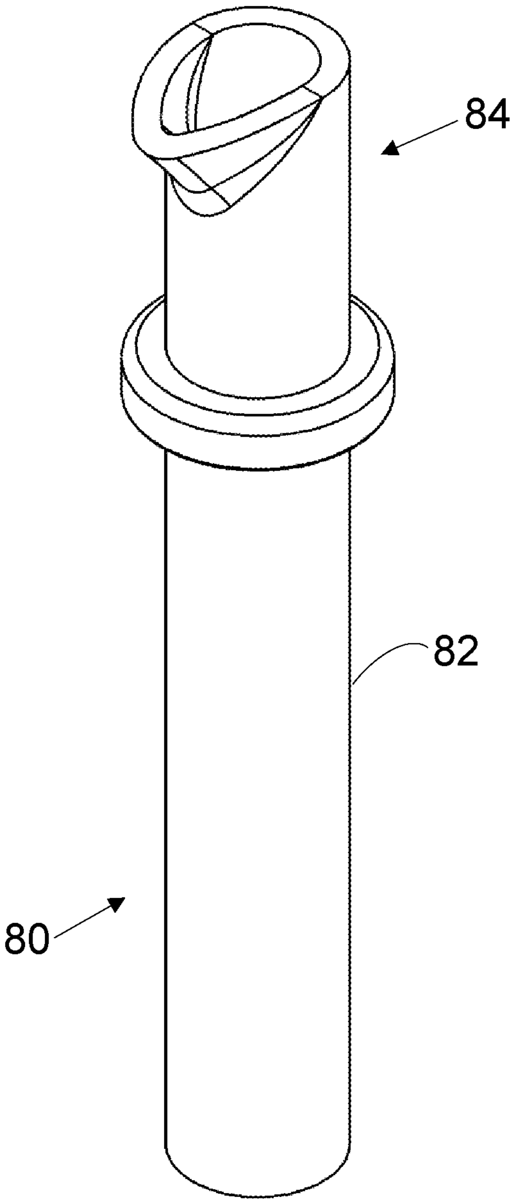

In a further embodiment, the tube extends past the upper surface of flange 90 so that water is expelled from the fountainhead aperture 92 at a location above flange 90. In such an embodiment, the flange is located along the tube at a position spaced from both of the upper end and the lower end of the tube. The flange is dimensioned and positioned to prevent the tube from passing through the aperture of the cover, thereby supporting the tube in a suspended position above the pump, see FIGS. 4*a* and 4*b* for examples. FIG. 4*b* includes a spout at the upper end 84 of tube 82.

Fountainhead 80 is formed of a durable, hygienic material. Preferably the material is glass, most preferably transparent or semi-transparent glass. By providing fountainhead 80 formed of a material that is transparent or at least semi-transparent, easy visual assessments can be performed to determine whether or not fountainhead 80 and/or water therein needs to be cleaned.

Cover 60 generally includes a top 62, sidewall 66 extending beneath top 62 and a base 64 formed at the bottom of sidewall 66 that is adapted to rest upon upper surface 23 of basin 20. Top 62 is formed as a dome or bowl having aperture 70 formed or otherwise placed therein. Top 64 is curved so that water flows down outer surface 63 and into basin 20. Importantly, top 62 is free of any depression in the outer surface thereof to allow smooth flow of water down the side thereof in a preferred embodiment.

Sidewall 66 of cover 60 is preferably disposed at a relatively small angle with respect to vertical. For example, the angle of sidewall 66 can range from about 1° to about 15° or 10° in some embodiments.

Sidewall 66 transitions to base 64 which includes a plurality of legs 67 that support cover 60 on basin 20. In a preferred embodiment three legs are present spaced equidistant or substantially equidistant from each other around the lower edge of base 64. Opening 68 is present between a pair of legs 67 to allow water to enter beneath cover 60 and flow into pump assembly 40. It is to be understood by one of ordinary skill in the art that some embodiments legs need not be present as water can pass underneath cover 60 between basin 20 and the cover. In still other embodiments the cover may include apertures, slits or other orifices which permit water to flow to inlet 44 of pump assembly 40 which is shown in the form of a grate.

With reference to the figures, during operation of the water fountain assembly, water in basin 20 is drawn through inlet 44 of pump assembly 40 Water preferably flows through a filter which can be located at an entrance to pump assembly 40 before being discharged through outlet 48. From there, the water flows upwardly through tube 82 of fountainhead 80 and out of aperture 92 in flange 90 or tube 82 whereafter it cascades outwardly and downwardly over top 62 and sidewalls 66 of cover 60 and back into basin 20 water returned to the pump assembly 40 enables water to continuously circulate during pump operation.

Due to the transparent or semi-transparent nature of the basin 20, cover 60 and fountainhead 80 of water fountain assembly 10, cleanliness of both the water and components of water fountain assembly can be assessed during use. When it is desired to service, clean or otherwise maintain water fountain assembly 10, the assembly 10 can be disassembled by disconnecting fountainhead 80 from pump outlet 48 by lifting fountainhead 80 upwardly in a vertical direction. As cover 60 is free of any attachment to pump assembly 40, it can simply be removed from the water fountain assembly.

During operation, a pet, such as a dog or cat, may drink directly from basin 20, from water flowing down over cover 60 and/or water emanating from fountainhead 80.

For the avoidance of doubt, it is understood that while various embodiments or aspects of the invention are described individually, it should be clear that two or more embodiments or aspects can be, and often times are, present in a single device according to the present invention.

For the avoidance of doubt, the devices and methods of the present invention encompass all possible combinations of the components, including various ranges of said components, disclosed herein. It is further noted that the term 'comprising' does not exclude the presence of other elements. However, it is also to be understood that a description of a product comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

What is claimed is:

1. A pet drinking water fountain assembly, comprising:

a basin formed of a transparent or semi-transparent material for holding water;

a cover formed of a transparent or semi-transparent material, having a top with an aperture, and a base;

a submersible pump arranged on the floor of the basin, the pump having an outlet;

a conduit comprising:

a tubular portion having a lower end and an upper end;

a positioning feature disposed along the tubular portion at a location spaced from the lower end, the positioning feature having a diameter greater than the cover aperture, such that the positioning feature rests on the top surface of the cover and suspends the tubular portion through the aperture, wherein the conduit is formed of glass; and wherein during operation, the pump circulates water from the basin through the conduit and out the positioning feature, allowing the water to flow over the outer surface of the cover and return to the basin.

2. The pet drinking water fountain of claim 1, wherein the basin and cover are formed of glass, and wherein the positioning feature is a flange integrally formed with or attached to the tubular portion.

3. The pet drinking water fountain of claim 1, wherein the tubular portion extends above the positioning feature and terminates in an outlet opening or spout.

4. The pet drinking water fountain of claim 1, wherein the basin, cover, and conduit are dishwashable and modularly assembled without fasteners, and wherein the transparency of the basin and cover enables visual monitoring of water clarity and level.

5. The pet drinking water fountain of claim 1, wherein the cover has no surface depressions and is shaped to encourage uniform water flow.

6. The pet drinking water fountain of claim 1, wherein the pump outlet comprises a cylindrical projection and the tubular portion fits over the cylindrical projection by friction or press-fit.

7. The pet drinking water fountain of claim 1, wherein the cover includes at least two support legs and at least one opening between the legs to allow water flow underneath.

8. The pet drinking water fountain of claim 1, wherein the positioning feature comprises a shoulder, ring, ridge, or radially extended portion that prevents the conduit from falling through the aperture.

9. A method of assembling a pet drinking water fountain, comprising:

placing a submersible pump in a transparent basin;

inserting a glass conduit through an aperture in a transparent dome-shaped cover;

resting a positioning feature of the glass conduit against a top of the cover so that the glass conduit is suspended;

placing the cover over the pump in the basin;

connecting a lower end of the glass conduit to an outlet of the pump;

and circulating water through the glass conduit and over an outer surface of the cover.

10. A pet hydration system comprising:

the assembly of claim 1;

wherein the water flows in a closed loop and is visible at all external flow stages, including within the basin and as it exits the conduit.

11. A pet drinking water fountain assembly, comprising:

a glass basin for holding water, the basin including a bottom and a side wall connected to and extending upwardly from the bottom;

a glass cover having a base, a top and a side wall extending between the base and the top, wherein the base rests upon an upper surface of the basin bottom, wherein the top has an aperture, a pump assembly arranged on the upper surface of the bottom of the basin beneath the cover, the pump assembly including a pump having an outlet for water;

a glass fountainhead including a glass tube having a flange positioned along the tube at a location spaced from a lower end of the tube, the flange having a diameter greater than that of the aperture in the cover, such that the flange rests on the cover and supports the tube in a suspended position, with the lower end of the tube positioned to engage the pump outlet, wherein the tube has an aperture;

wherein during operation of the fountain assembly the pump assembly delivers water to the fountainhead that flows out of the tube aperture, and downwardly onto the cover and into the basin where the water can be recirculated through the pump assembly.

12. The pet drinking water fountain assembly according to claim 11, wherein the basin, the fountainhead, and the cover are substantially transparent in order to allow visual assessment of one or more of water level, water cleanliness, and basin cleanliness.

13. The pet drinking water fountain assembly according to claim 12, wherein the pump outlet comprises a cylindrical projection, wherein the lower end of the tube is operatively connected around and to the cylindrical projection of the pump outlet.

14. The pet drinking water fountain assembly according to claim 11, wherein the flange is located at an upper end of the tube, wherein the flange has a rim that extends outwardly from the upper outer end of the tube and has a diameter greater than a largest diameter of the tube.

15. The pet drinking water fountain assembly according to claim 11, wherein a lower surface of the flange contacts an upper surface of the top of the cover.

16. The pet drinking water fountain assembly according to claim 11, wherein the base of the cover includes at least two legs, which rests upon the upper surface of the basin bottom, and wherein the space between the at least two legs allow water to flow between the outside of the cover and inside of the cover.

17. The pet drinking water fountain assembly according to claim 16, wherein three legs are present.

18. The pet drinking water fountain assembly according to claim 11, wherein the pump assembly is removably connected to the bottom of the basin by suction cups.

19. The pet drinking water fountain assembly according to claim 11, wherein the side wall of the basin is cylindrical.

20. The pet drinking water fountain assembly of claim 1, wherein the positioning feature further functions to stabilize the conduit and to redirect water flow away from the cover aperture.

* * * * *